United States Patent [19]

Grieser et al.

[11] Patent Number: 5,772,353
[45] Date of Patent: Jun. 30, 1998

[54] HOUSING FOR JOINT FORMING DEVICES

[75] Inventors: Jerry D. Grieser, Archbold; Richard A. Nelson, Napoleon; Steven R. Munday, Stryker, all of Ohio; William E. T. Vallance, Marlow, England

[73] Assignee: Titus International PLC, Buckinghamshire, England

[21] Appl. No.: 657,931

[22] Filed: May 30, 1996

[30] Foreign Application Priority Data

May 31, 1995 [GB] United Kingdom ............... 9511021

[51] Int. Cl.⁶ .................................................. F16B 12/00
[52] U.S. Cl. .................... 403/231; 403/409.1; 403/405.1
[58] Field of Search ................................. 403/231, 230, 403/245, 405.1, 409.1, 407.1, 406.1, 351, 367, DIG. 8, 297

[56] References Cited

U.S. PATENT DOCUMENTS

| | | | |
|---|---|---|---|
| 2,884,270 | 4/1959 | Carlberg | 403/351 X |
| 3,088,178 | 5/1963 | Propst | 403/297 |
| 3,419,293 | 12/1968 | Conrad | 403/351 |
| 3,515,418 | 6/1970 | Nielson, Jr. | 403/307 X |
| 4,099,293 | 7/1978 | Pittasch | 403/231 X |
| 4,131,376 | 12/1978 | Busse | 403/231 X |
| 4,332,495 | 6/1982 | Bürgers | 403/6 |
| 4,518,278 | 5/1985 | Koch | 403/230 |
| 4,545,698 | 10/1985 | Koch | 403/231 |
| 4,599,011 | 7/1986 | Tashiro et al. | 403/245 X |
| 5,143,473 | 9/1992 | Harley | 403/231 |
| 5,284,401 | 2/1994 | Harley | 403/407.1 X |
| 5,460,458 | 10/1995 | Caceres | 403/351 X |

FOREIGN PATENT DOCUMENTS

| | | |
|---|---|---|
| 1467282 | 1/1967 | France ............... 403/405.1 |
| 794608 | 5/1958 | United Kingdom . |
| 1009985 | 11/1965 | United Kingdom . |
| 1174319 | 12/1969 | United Kingdom . |
| 1571697 | 7/1980 | United Kingdom . |
| 1573172 | 8/1980 | United Kingdom . |
| 2040385A | 8/1980 | United Kingdom . |
| 1582761 | 1/1981 | United Kingdom . |
| 2074282A | 10/1981 | United Kingdom . |
| 2119052A | 11/1983 | United Kingdom . |
| 2119053A | 11/1983 | United Kingdom . |
| 2172076A | 9/1986 | United Kingdom . |
| 2241299B | 8/1991 | United Kingdom . |
| 2246826A | 2/1992 | United Kingdom . |
| 2277973A | 11/1994 | United Kingdom . |
| 2285106A | 6/1995 | United Kingdom . |

*Primary Examiner*—Harry C. Kim
*Attorney, Agent, or Firm*—Emch, Schaffer, Schaub & Porcello Co., L.P.A.

[57] ABSTRACT

A housing for a joint forming device for forming a joint between two members comprises a sleeve (22) for housing a camming element (24) of such a joint forming device. The sleeve (22) has at least one moveable portion (40,42) adapted to move outwardly of the outer periphery of the sleeve as indicated by the arrows (46) in response to movement of such a camming element housed therein during tightening of the joint for forceably engaging a wall of a recess in one of the members in which the sleeve is fitted.

22 Claims, 6 Drawing Sheets

HOUSING FOR JOINT FORMING DEVICES

The invention relates to joint forming devices and more particularly to a housing for such joint forming devices.

A known joint forming device for forming a joint between two members comprises a fastening element in the form of an elongate pin which is insertable in a surface of one of the joint members with a head portion protruding from the member and a tightening element in the form of a rotatable camming element which is positioned in a recess in the other joint member and arranged to receive the head portion of the pin. A joint can be formed between the two members by rotation of the camming element which grips the head portion and pulls the pin inwardly thereof thus drawing the two joint members together. Such a joint forming device is disclosed in GB 2241299B, GB 2246826B and GB 2277973A and GB 2285106A.

Figure 1:
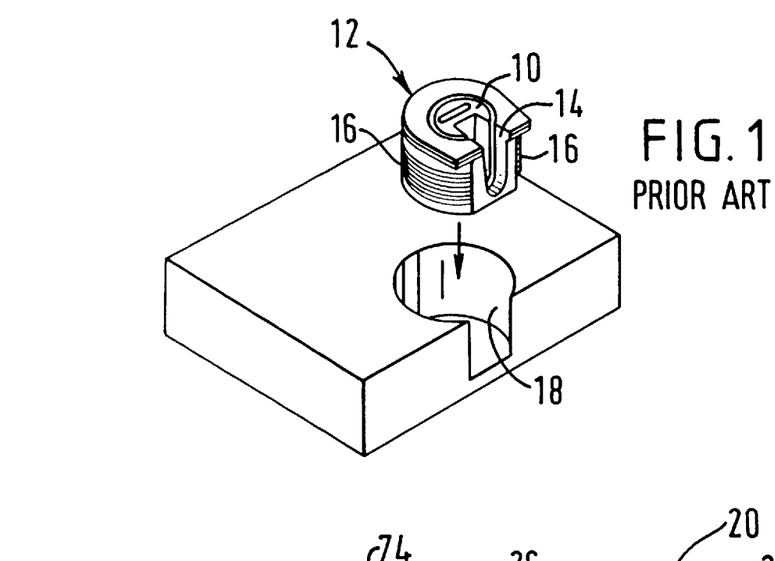
FIG. 1 is a perspective view of a known housing for a camming element in use.

Typically the recess for the camming element is formed in a major surface of one of the joint members and access for the pin is provided by a bore which extends from an edge of the member and opens into the recess. In order to reduce the number of machining operations on the joint member which receives the camming element, it is known to form the recess therefor at an edge of the joint member as shown in FIG. 1. In this case, the camming member 10 is housed in a sleeve 12 which has a slot 14 to allow the head portion of the pin to be inserted into the camming element. The recess is formed such that the sleeve is a force fit therein and the sleeve is provided with formations 16 for gripping a wall 18 of the recess.

The known sleeve which is typically made of a plastics material has two disadvantages. Firstly, the person assembling the joint is required to force fit the sleeve into the recess, typically by means of a mallet, and secondly if for any reason the sleeve is incorrectly fitted in the recess, it is often impossible to remove it without damaging the joint member and/or the sleeve. In the field of knock-down furniture in which such joint forming devices are widely used, it is desirable to provide a device which can be fitted to the joint members without the use of tools and which can be readily removed therefrom without damage to either the joint member or components of the joint forming device.

It is an object of the invention to at least partially overcome the above-described problems.

Accordingly, the invention provides a housing for a joint forming device for forming a joint between two members, the housing comprising a sleeve for housing a camming element of such a joint forming device and having at least one moveable portion adapted to move outwardly of the outer periphery of the sleeve, in use, in response to movement of such a camming element housed in the sleeve during tightening of said joint for forceably engaging a wall of a recess in one of said members in which the sleeve is fitted.

The or each said moveable portion may be resiliently deflectable in response to said movement of the camming element.

The or each moveable portion may be an integral part of said sleeve separated partly from the remainder thereof by one or more slots provided in said sleeve.

The or each said moveable portion may be separated partly from the remainder of the sleeve by a generally L-shaped slot.

The or at least one said moveable portion may comprise cam means, said cam means being cooperable with such a tightening element housed in the sleeve for at least in part causing said outward movement of the or each said moveable portion.

The housing means may comprise formations cooperable with formations of such a camming element for facilitating locking of the joint forming device.

The formations of the housing may comprise a plurality of substantially equi-spaced depressions disposed in a surface of said sleeve which surface defines a recess for housing such a camming element.

The housing may further comprise a bush for housing at least an expansion portion of an elongate fastening element of such a joint forming device such that said fastening element is engageable with such a camming element housed in said sleeve, said bush being integral with, or releasably engageable with, said sleeve.

The invention also includes a device for use in forming a joint between two members, the device comprising a housing to be fitted in a recess in one of said members, a tightening element to be housed by said housing and an elongate fastening element having a longitudinal axis to be fitted to the other of said members, said tightening element having at least one arcuate camming surface cooperably engageable with a respective engaging surface of said fastening element whereby movement of said tightening element causes axial movement of said fastening element to cause a joint formed between said two members with said device to tighten, said housing comprising a sleeve for housing said tightening element, said housing having at least one moveable portion adapted to move outwardly of the outer periphery of the sleeve, in use, in response to tightening of said joint by said movement of the tightening element housed therein for forceably engaging with a wall of said recess in which the sleeve is fitted.

The or at least one said moveable portion may comprise cam means, said cam means being cooperable with said tightening element housed in said sleeve for at least in part causing said outward movement of the or each said moveable portion.

The housing may be provided with formations cooperably engageable with formations of the tightening element for facilitating locking of the joint forming device.

The formations of the housing may comprise circumferentially spaced depressions disposed in a surface of said sleeve which defines a recess for housing the tightening element and said formations of the tightening element comprise a plurality of protrusions on an external surface of the tightening element.

The tightening element may comprise cam means for actuating the or each said moveable portion.

The housing may further comprise a bush for housing at least an expansion portion of said elongate fastening element, such that the or each said camming surface is engageable with the respective engaging surface of the fastening element by said rotation of the tightening element, said bush being integral with, or releasably engageable with, said sleeve.

The bush may be connected, or connectable, with said sleeve by resilient means.

The resilient means may comprise a plurality of flexible membranes.

The bush may be releasably engageable with said sleeve, said bush having flexible membrane means extending from an end region thereof and said sleeve defining a recess for receiving said flexible membrane means.

The bush may be integral with said sleeve, said sleeve and bush comprising a first body part and a second body part, said body parts being snap-fittable together.

In order that the invention may be well understood, some embodiments thereof, which are given by way of example only, will now be described with reference to the accompanying drawings, in which.

Referring to FIGS. 2 to 8, a housing 20 for a joint forming device for forming a joint between two members comprises a sleeve 22 for housing a tightening, or camming, element 24 of such a joint forming device and a bush 26 for housing at least an expansion portion 28 of an elongate fastening element 30 of such a device. In combination, the housing 20, tightening element 24 and fastening element 30 constitute a joint forming device for forming a joint between two members, such as two panels of an item of knock-down furniture.

Figure 2:
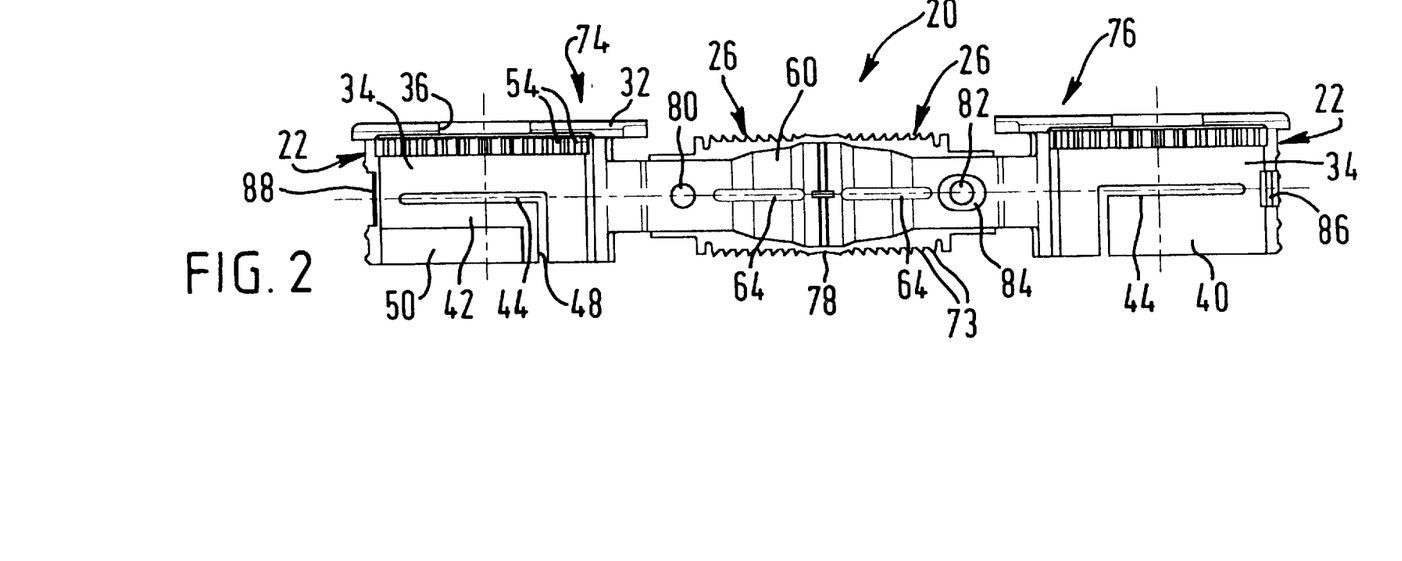
FIG. 2 is a side view of a housing according to the invention in an open condition prior to insertion of a fastening element and a tightening element to be housed therein.

In FIG. 2, the housing 20 is shown in an open condition in which form it can be manufactured as a one-piece split plastics moulding as will be described in more detail below. The housing is shown in a closed, use condition, in FIG. 3.

The sleeve is provided with a generally planar cap 32 which cooperates with an interior surface 34 of the sleeve to define a recess having a generally circular cross-section in which the tightening element is housed. The cap 32 is provided with a through-hole 36 through which a screwdriver slot 38 of the tightening element can be accessed.

The housing comprises two oppositely disposed moveable portions 40, 42. The moveable portions 40, 42 are adapted to move generally radially outwardly of the outer periphery of the sleeve 22 in the direction of the arrows 46 (see FIG. 3) in response to movement in a joint tightening direction by the tightening element 24 housed in the sleeve. This movement, at least in part, provides a radially outward expansion of the sleeve for gripping a wall of a recess in which the sleeve is fitted in use.

Each moveable portion 40, 42 is an integral part of the sleeve 22 and is separated partly from the remainder thereof by a generally L-shaped slot 44, as best seen in FIG. 2.

The slots 44 extend between the outer periphery of the sleeve and the interior surface 34 of the sleeve. Each of the moveable portions has a free end 48 defined by the respective slots 44.

The moveable portion 42 is provided with cam means comprising a rib 50 which is disposed internally of the sleeve for cooperating with cam means 52 of the tightening element to cause the generally radially outward movement of the moveable portions 40, 42. The rib 50 extends lengthwise of the moveable portion 42 and has a height above the interior surface 34 which increases progressively to a maximum at the end of the rib which is adjacent the free end 48 of the moveable portion 42.

The housing 20 further comprises formations, shown as depressions 54, cooperable with formations, shown as protrusions 56, of the tightening element 24 for facilitating locking of the joint forming device. With regard to FIG. 3, the depressions 54 and protrusions 56 have not been illustrated by means of dashed lines as is conventional when depicting hidden detail in order to improve the clarity of the drawing.

Figure 5:
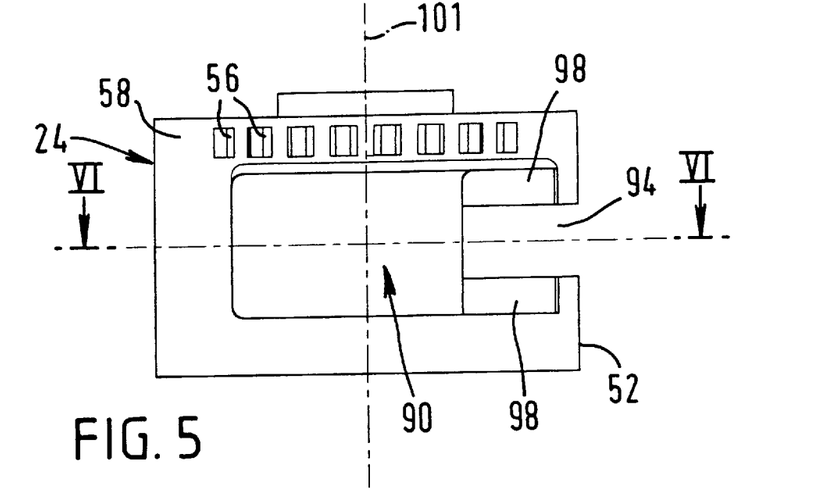
FIG. 5 is a side view of the tightening element.
Figure 6:
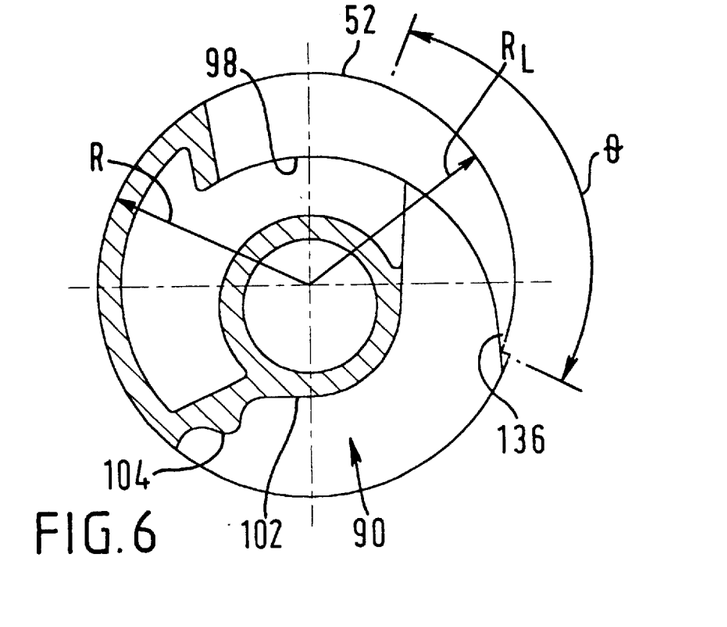
FIG. 6 is a section on line VI—VI in FIG. 5.

The depressions are substantially equi-spaced and are disposed along the length of the interior surface 34 of the sleeve. As best seen in FIG. 5, the protrusions 56 are provided on a peripheral surface 58 of the tightening element. The protrusions are disposed in two groups spaced 180° apart, one such group being shown in FIG. 5. In use, when the tightening element housed in the sleeve is rotated, the cooperable engagement of the protrusions and depressions provides a ratchet-like effect and defines a plurality of locked positions of the joint forming device.

The bush 26 is a generally cylindrical element having a through-passage 60 which has an end portion remote from the sleeve 22 which is shaped to correspond to the expansion portion 28 of the fastening element 30. The bush comprises opposed lengthwise extending slots 64 which facilitate a generally radially outward expansion of the bush, in use, for providing forceable engagement with a wall of a recess in which the bush is fitted.

The sleeve 22 and bush 26 are connected by resilient means in the form of opposed flexible membranes 66. The membranes 66 are arcuate in the lengthwise direction thereof and extend from opposite sides of a generally rectangular leading end portion 68 of the bush to opposite corner regions 70 of the sleeve 22.

The sleeve and bush are each provided with external formations for gripping the wall of their respective recesses 124, 132 when the sleeve/bush is expanded into forceable engagement therewith. The formations of the sleeve comprise elongate ribs 72 which extend at least partially circumferentially thereof. It will be appreciated that the ribs 72 will not be continuous in the region of the catch element 86. The formations of the bush comprise barbs 73 which extend between the slots 64.

The sleeve 22, bush 26 and flexible membranes 66 are integral and as indicated above can be manufactured as a one-piece split plastics moulding. In more detail, the moulding comprises a first body part 74 and a second body part 76 each of which defines one half of the housing. More specifically, the body parts 74, 76 each define one half of the bush and sleeve and one flexible membrane extending therebetween. The respective ends of the body parts 74, 76 which define the bush halves are connected by hinge portions 78. The body parts can be folded together about the hinge portions 78 to a closed, use condition best seen in FIG. 3. The body parts are adapted to be snap-fittable together and are shown with the first body part 74 provided with a protrusion 80 which is snap-fittingly engageable in a bore 82 provided in a spigot 84 formed on the second body part 76. At the end of the sleeve 22 remote from the bush, the second body part 76 is provided with a catch element 86 which extends in a generally circumferential direction of the sleeve for snap-fitting engagement with a recess indicated at 88, in the first body part 74.

As described above, the slots 44 which define the moveable portions 40, 42 extend between the outer periphery of the sleeve and the interior surface 34. In order to improve the efficiency of the plastics moulding process, and in particular to reduce wear of the tooling, it is envisaged that a thin membrane of the plastics material may be left adjacent the surface 34 so that the slots 44 would not extend to the interior of the sleeve portion. It is envisaged that this membrane would be in the region of 1 mm in thickness and it will be appreciated that such a membrane would not prevent outward movement of the moveable portions 40, 42.

Figure 4:
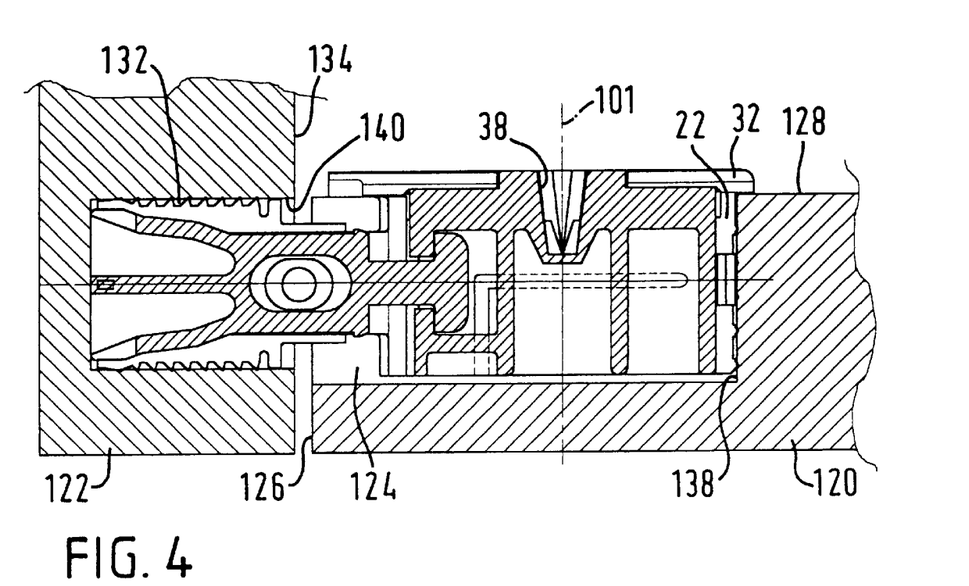
FIG. 4 is a section on line IV—IV in FIG. 3 showing the housing fitted to two members of a joint.

The tightening element 24 comprises a generally drum-like element having an opening 90 through which a head portion 92 of the fastening element 30 can be inserted into a hollow interior of the tightening element. A slot 94 extends from the opening 90 partially circumferentially of the tightening element and is adapted to receive a neck portion 96 of the fastening element as shown in FIG. 4.

The tightening element further comprises two arcuate camming surfaces 98 adapted to engage respective discrete engaging surfaces 100 of the fastening element whereby rotation of the tightening element in a clockwise (as viewed in FIG. 3) sense causes axial movement of the fastening element towards the axis of rotation 101 of the tightening element.

In addition to the two arcuate camming surfaces 98, the tightening element comprises an internal cam means 102 for causing axial movement of the fastening element in a direction away from the axis of rotation 101 by rotation of the tightening element in an anticlockwise sense for facilitating release of the fastening element from a tightened condition. The internal cam means comprises a surface 102 defining a ridge 104 which extends generally parallel to the axis of rotation 101 for engaging a leading end 103 of the fastening element.

The peripheral surface 58 of the tightening element at the lower (as viewed in FIG. 4) end of the tightening element is profiled to define the cam means 52. As best seen in FIG. 5, the tightening element has a generally circular profile defined by a radius R. The cam means 52 includes a section of the lower end outer periphery having an angular extent θ of approximately 90° which has a varying radial extent $R_L$ which is less than R. The reduction in the radial extent $R_L$ of the cam means 52 increases progressively in the clockwise direction of the section defined by the angle θ. Thus, the cam means 52 comprises portions having a radius R and a relieved section θ having a radius $R_L$ which is progressively less than radius R over the angular extent thereof. The profile of the relieved section θ is adapted to complement the profile of the rib 50 so as to provide a substantially continuous contact between the moveable portion 42 and the relieved section θ of the cam means 52.

Figure 8:
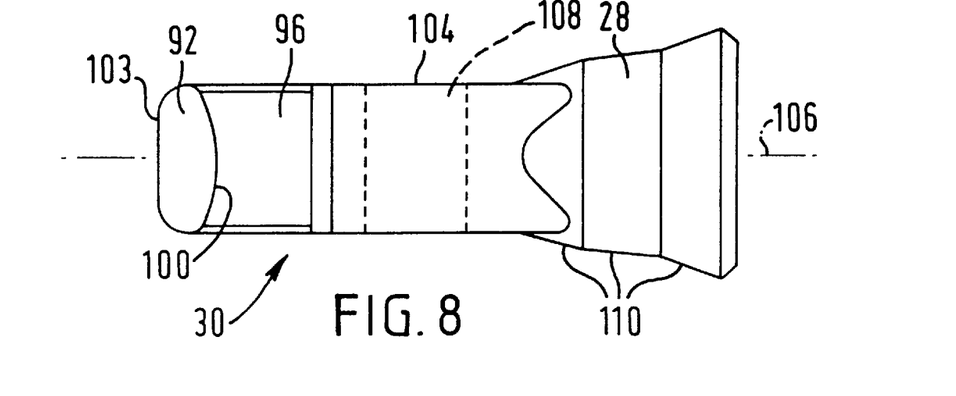
FIG. 8 is a side view of a fastening element.

With reference to FIG. 8, the fastening element 30 is an elongate pin member comprising a leading end portion 104 which has a generally rectangular, and preferably square, transverse cross-section and the expansion portion 28. The leading end portion 104 comprises the head portion 92 and neck portion 96. The neck portion is defined by opposed slots extending transversely of the longitudinal axis 106 of the fastening element. The engaging surfaces 100 of the fastening element are each defined by a wall of a respective one of the slots which define the neck portion 96 and have a length extending transversely of the longitudinal axis 106.

The fastening element is provided with a through-aperture 108 in which the protrusion 80 and spigot 84 are received when the two body parts 74, 76 are snap-fitted together.

The expansion portion 28 has a generally circular transverse cross-section and comprises a plurality of taper portions 110. The function of the expansion portion 28 and its interaction with the bush 26 will be described in more detail below.

Figure 3:
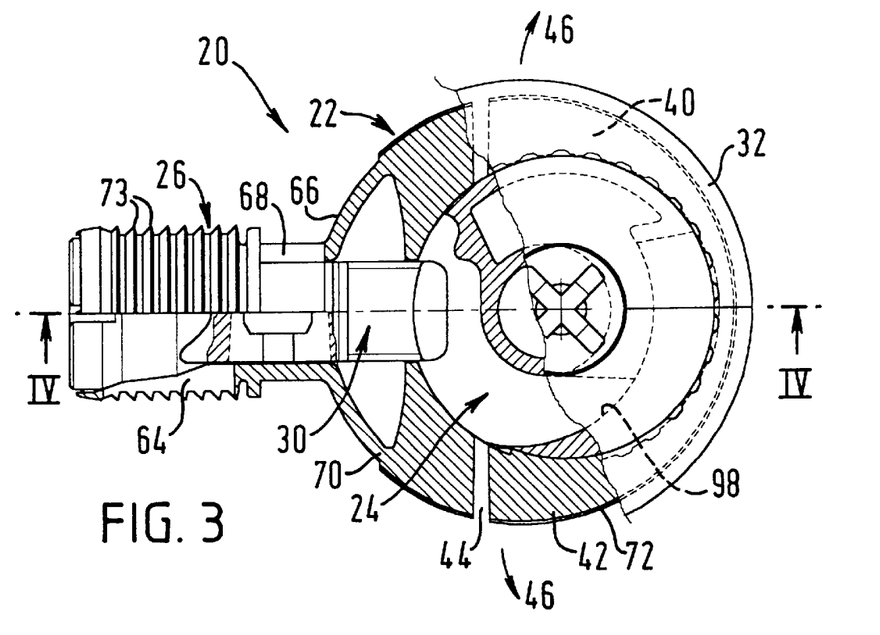
FIG. 3 is a partially sectioned plan view of the housing of FIG. 2 in a closed condition housing a fastening element and a tightening element.

Although not essential, it is envisaged that the joint forming device comprising the housing 20, tightening element 24 and fastening element 30 will be supplied ready assembled as shown in FIG. 3. The device is assembled by first taking the housing 20 in its open condition, as shown in FIG. 2, and inserting a tightening element 24 into the recess defined by the interior surface 34 in one of the halves of the sleeve 22. To allow insertion of a fastening element 30, the opening 90 of the tightening element is positioned so as to face the through-passage 60 of the bush 26. The fastening element is fitted to the housing by inserting the expansion portion 28 into the corresponding half of the bush with the protrusion 80 or spigot 84 extending into the through-aperture 108 of the fastening element depending on which of the two body parts 74, 76 the fastening and tightening elements are inserted into. In this condition, the head portion 92 of the fastening element is positioned internally of the tightening element such that rotation of the tightening element in the clockwise sense will bring the camming surfaces 98 into engagement with the respective engaging surfaces 100 of the fastening element. Assembly of the device is completed by bringing the two body parts together so that the protrusion 80 and bore 82 and the catch element 86 and recess 88 snap-fittingly engage. In this assembled condition, a unitary joint forming device is provided which is ready for fitting to two members for forming a joint therebetween.

With reference to FIG. 4, in order to form a joint between two members 120, 122, the sleeve 22 is fitted into a recess 124 in the joint member 120 with the bush 26 extending beyond an edge 126 of the member 120. The recess 124 is formed in a major surface 128 of the member 120 and may be positioned so as to open at the edge 126 in order to allow the second housing to extend beyond the edge 126. Alternatively, a further recess may be provided extending between the recess 124 and edge 126. The recess 124 should be sized to allow the sleeve to be inserted therein simply by pressing lightly on the cap 32. The cap 32 serves as a depth stop for the sleeve and to cover any chips made in the surface 128 of the member 120 by the forming of the recesses 124.

With the sleeve 22 thus installed in the recess 124, assembly of the joint is completed by moving the joint member 122 towards the edge 126 such that the bush 26 enters a recess 132 in a major surface 134 of the member 122. Assembly is complete when the major surface 134 of the member 122 abuts the edge 126. The recess 132 is preferably sized to provide a close clearance fit with the bush so that substantially no force is required in order to bring the two joint members together with the major surface 134 abutting the edge 126. A gap is shown between the two members to illustrate the advantage of having a flexible connection between the bush and the sleeve as described in more detail below.

Figure 7:
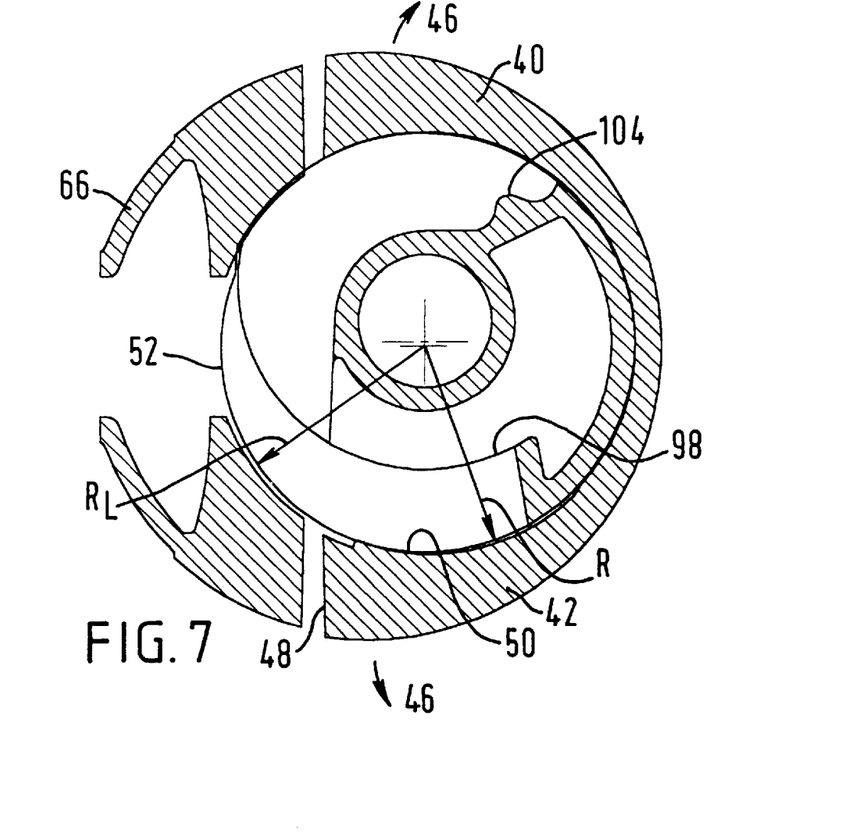
FIG. 7 is an enlarged view of the sleeve and tightening element in FIG. 3 with the tightening element rotated approximately 90° clockwise from the position shown in FIG. 3.

The joint thus assembled is tightened by rotating the tightening element 24 in a clockwise sense by means of a screwdriver inserted in the screwdriver slot 38. The first 90° of rotation of the tightening element moves the opening 90 out of alignment with the through-passage 60 and brings the respective leading ends 136 of the camming surfaces into a position in which they engage the respective engaging surfaces 100 which position is shown in FIG. 7. During that first 90° or so of rotation, the relieved section θ of the cam means 52 moves approximately into line with the through-passage 60 so that a portion of the cam means 52 having a radius R is brought into contact with the rib 50. It will be appreciated that as the tightening element is rotated, the moveable portion 42 is progressively deflected radially outwardly in the direction of the arrows 46 as contact with the relieved section θ is replaced by contact with the full radius R portions of the cam means 52. Although the radius of the cam means 52 acting upon the moveable portion 40 does not increase with rotation of the tightening element, the arrangement is such that provided the recess 124 is sized correctly, the moveable portion 42 can only move outwardly to a certain extent before contacting a wall 138 of the recess 124 and thus further expansion of the first housing is generated through outward movement of the moveable portion 40. In more detail, the initial effect of the rotation of the tightening element is that the moveable portion 42 is moved outwardly by the interaction of the rib 50 and cam means 52 until it is forceably engaged with the wall 138 and is thus prevented from moving further. The continued interaction of the cam means 52 and rib 50 as the tightening element is rotated then generates a force which causes the tightening element to move in the sleeve portion in the direction of the moveable portion 40 which is thus caused to move outwardly of the outer periphery of the sleeve portion to a position in which it forceably engages the wall 138. Thus, the first 90° or so of rotation of the tightening element causes a generally radially outward expansion of the tightening element for forceably engaging the wall 138 of the recess 124 in which it is fitted.

As clockwise rotation of the tightening element 22 is continued beyond the position shown in FIG. 1, the camming surfaces 98 engaging the respective engaging surfaces 100 of the fastening element cause the fastening element to move axially towards the axis of rotation 101 of the tightening element. The initial effect of that movement is to pull the taper portions 110 into the corresponding taper portions of the through-passage 60 causing the bush 26 to expand radially outwardly to forceably engage a wall 140 of the recess 132. Once the sleeve and bush have been expanded to forceably engage the walls of their respective recesses, further rotation of the tightening element applies a compressive force to the joint members 120, 122 ensuring that the joint is tightly made.

Two additional effects can be obtained by continued clockwise rotation of the tightening element beyond the point at which the first and second housings are forceably engaged with their respective recesses. Firstly, the tightening element tends to move slightly in the first housing towards the edge 126 of the joint member. This movement causes further expansion of the first housing by forcing the two halves of the first housing apart. Thus the forceable engagement between the outer periphery of the sleeve portion and the wall 138 of the recess 124 is intensified. It will be appreciated that the rotation of the tightening element provides two camming actions: firstly, the interaction of the cam means 52 and rib 50 and secondly, linear movement of the tightening element towards the second housing.

The second additional effect is the closure of any gap between the two joint members. Provided the recesses 124, 132 are sized correctly (i.e. within a predetermined tolerance) and the major surface 134 and edge 126 are flat, it should be possible to bring the two joint members together by hand as described above with no gap therebetween. In such a case, no pull-up of the joint in the tightening process is required. However, it is envisaged that these ideal conditions will not always be obtained and that a gap may initially be present as shown in FIG. 4. It will be understood that the resilience of the flexible membranes 66 allows the joint forming device to provide a pull-up action when required. In more detail, if when the two housings have been expanded into forceable engagement with the walls of their respective recesses there is a gap between the two members, the pulling force generated by the arcuate camming surfaces 98 which draws the fastening element towards the axis of rotation 101 causes the flexible membranes 66 to flex inwardly in the general direction of the sleeve 22 such that the member 122 is pulled toward the member 120 via the bush 26 to close the gap. Once the gap is closed, continued rotation of the tightening element applies a compressive force to the joint members which ensures that the joint is tightly made.

The joint can readily be disassembled by reversing the above-described tightening process. As the tightening element is rotated in the anti-clockwise sense, the resiliently deflectable moveable portions move towards the outer periphery of the tightening element to return the sleeve to a non-expanded condition and the fastening element is pushed away from the axis of rotation by virtue of contact between the surface 102 and the leading end 103 of the fastening element. If the tightening element is rotated anti-clockwise beyond the position at which the opening 90 is aligned with the through-passage 60, the leading end 103 of the fastening element is contacted by the ridge 104. The ridge 104 is configured to provide a substantial movement of the fastening element away from the axis of rotation 101 thereby moving the expansion portion 28 out of expanding engagement with the tapered portion of the through-passage 60. The movement of the fastening element provided by the ridge 104 ensures that the expansion portion 28 is moved to a position in which the bush can return to its non-expanded condition so that it can readily be removed from the recess 132.

With the sleeve 22 and bush 26 returned to a non-expanded condition, the joint can be disassembled by removing the housings from their respective recesses 124, 132. It will be appreciated that since the sleeve and bush resiliently deform to assume an expanded condition, the joint forming device is re-usable.

With regard to the connecting means between the sleeve and the bush, it is to be understood that although preferred, it is not essential that these are resilient. The connection may be by rigid means. However, in the case of a rigid connection, the pull-up action described above will not occur and thus the joint forming device may in certain circumstances provide a joint which although tightly made, has a gap between the joint members.

It is also to be understood that it is not essential that the sleeve, bush and connecting means therebetween are integral. Instead, the sleeve and bush may be releasably connected by the connecting means as shown in FIG. 9.

Figure 9:
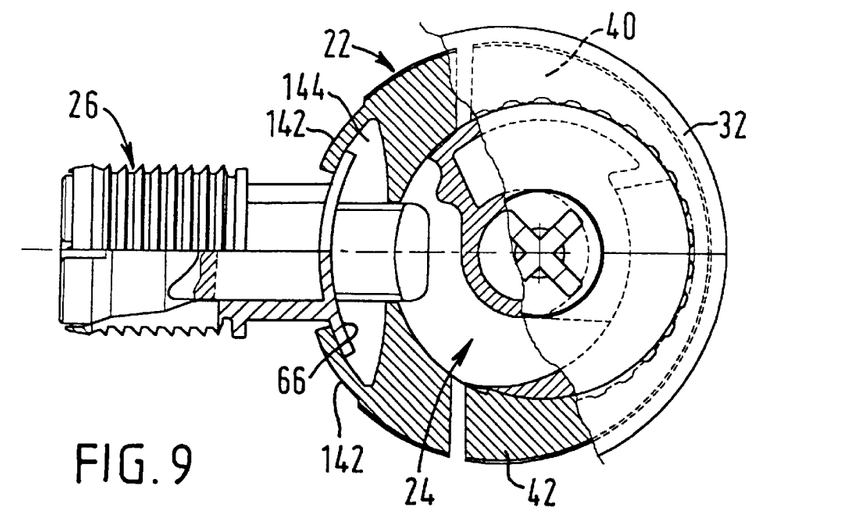
FIG. 9 is a partially sectioned top plan view of a joint forming device in which sleeve and bush are releasably connected.

In FIG. 9, the configuration of the sleeve and bush is generally the same as the joint forming device shown in FIG. 3 and accordingly the same reference numerals will be used to describe like parts. Optionally, as shown, the sleeve 22 and bush 26 may be formed as one piece components and not split as in the FIG. 3 embodiment. The sleeve 22 comprises moveable portions 40, 42 and a planar cap 32. The sleeve includes arcuate extension arms 142 which extend towards the bush 26. The extension arms 142 and the cap 32 define a recess 144.

The bush 26 comprises a flexible membrane 66 disposed at one end thereof. The membrane 66 includes an aperture through which the head portion 92 of the fastening element may protrude for engaging with the camming surfaces of the tightening element 24 and has respective portions extending from opposite sides of the second housing.

In order to connect the sleeve and the bush, the flexible membrane 66 is inserted into the recess 144. The configuration of the membrane 66 and extension arms 142 is such that there is interference therebetween to provide a force by which the connection between the sleeve and the bush is maintained. Thus the joint forming device of FIG. 9 can be supplied to the customer ready assembled as a unitary joint forming device.

The assembly of a joint with the FIG. 9 device and the tightening process corresponds to that described in connection with the device shown in FIGS. 2 to 8.

Further embodiments of the joint forming device showing alternative means for connecting the first and second housing will now be described with reference to FIGS. 10 to 12.

Figure 10:
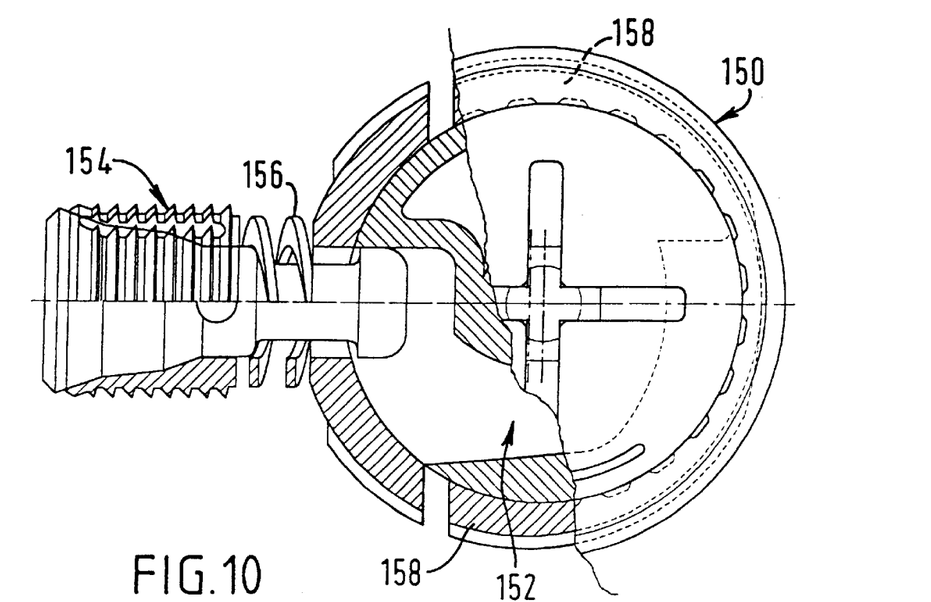
FIG. 10 is a partially sectioned top plan view of another joint forming device.

In FIG. 10, a sleeve 150 housing a tightening element 152 is connected with a bush 154 by resilient connecting means having the form of a coil spring 156. The sleeve 150, bush 154 and coil spring 156 are integral and can be manufactured as a one-piece plastics moulding. It will be appreciated that the moulding will not be split as in the case of the first described embodiment and that the first housing is provided with moveable portions 158 in order to obtain a radially outward expansion thereof by rotation of the tightening element. A joint between two members can be formed, tightened and disassembled in the manner described in connection with the joint forming device of FIGS. 2 to 8.

Figure 11:
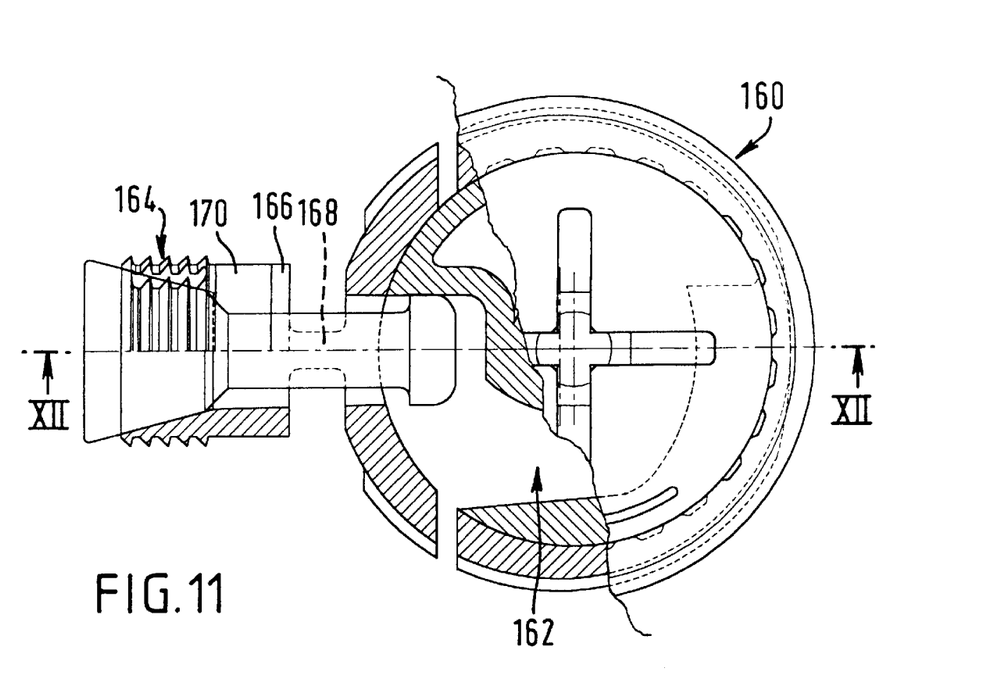
FIG. 11 is a partially sectioned top plan view of yet another joint forming device.
Figure 12:
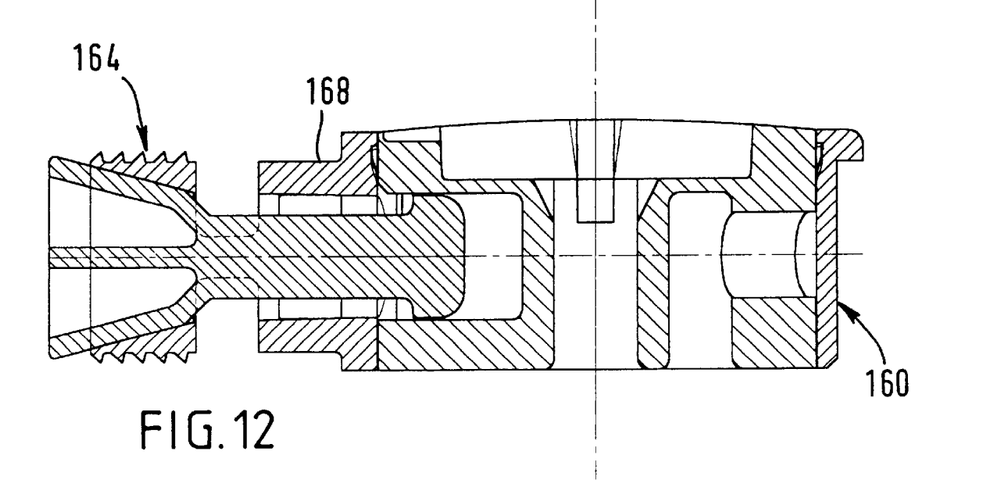
FIG. 12 is a section on line XII—XII in FIG. 11.

In FIGS. 11 and 12, a sleeve 160 housing a tightening element 162 is connected with a bush 164 by an integral resilient connecting means. The connecting means comprises a ring element 166 connected with respective opposed pairs struts 168, 170. The struts 168 extending from the sleeve 160 are radially offset 90° with respect to the struts 170 which extend from the bush 164. As with the FIG. 10 embodiment, the sleeve 160, bush 164 and the resilient connecting means 166, 168, 170 are integral and can be manufactured as a one-piece plastics moulding. It will be appreciated that the moulding may be a split moulding if desired.

It is to be understood that the sleeve 22, 150, 160 may be used by itself in a manner analogous to that shown in FIG. 1 to house a tightening element for cooperably engaging with a fastening element which could be adapted for screwing to a joint member to which it is to be fitted. A sleeve 22, 150, 160 not connected or connectable with a bush 26, 154, 164 has the advantage over the known sleeve shown in FIG. 1 of being fittable to the joint member as a light press-fit not requiring any tool and that it can be removed from the joint member and re-used if required.

We claim:

1. A housing for a joint forming device for forming a joint between two members, the housing comprising a sleeve for housing a camming element of said joint forming device and having at least one moveable portion adapted to move outwardly of the outer periphery of the sleeve, in use, in response to movement of said camming element housed in the sleeve during tightening of said joint for forceably engaging a wall of a recess in the one of said members in which the sleeve is fitted, wherein said housing comprises formations cooperable with formations of said camming element for facilitating locking of the joint forming device, said formations of the housing comprising a plurality of substantially equi-spaced depressions disposed in a surface of said sleeve which surface defines a recess for housing said camming element.

2. A housing for a joint forming device for forming a joint between two members, the housing comprising a sleeve for housing a camming element of said joint forming device and having at least one moveable portion adapted to move outwardly of the outer periphery of the sleeve, in use, in response to rotational movement of said camming element housed in the sleeve during tightening of said joint for forceably engaging a wall of a recess in the one of said members in which the sleeve is fitted, said housing further comprising a bush for housing at least an expansion portion of an elongate fastening element of said joint forming device such that said fastening element is engageable with said camming element housed in said sleeve, said bush being integral with, or releasably engageable with, said sleeve.

3. A housing as claimed in claim 2, wherein said bush is connected, or connectable, with said sleeve by resilient means.

4. A housing for a joint forming device for forming a joint between two members, the housing comprising:

a sleeve for housing a camming element of said joint forming device and having at least one moveable portion adapted to move outwardly of the outer periphery of the sleeve, in use, in response to movement of said camming element housed in the sleeve during tightening of said joint for forceably engaging a wall of a recess in the one of said joint members in which the sleeve is fitted; and a bush for housing at least an expansion portion of an elongate fastening element of said joint forming device such that said fastening element is engageable with said camming element housed in said sleeve, said bush being connected with said sleeve by resilient means comprising a plurality of flexible membranes.

5. A housing for a joint forming device for forming a joint between two members, the housing comprising:

a sleeve for housing a camming element of said joint forming device and having at least one moveable portion adapted to move outwardly of the outer periphery of the sleeve, in use, in response to movement of said camming element housed in the sleeve during tightening of said joint for forceably engaging a wall of a recess in the one of said joint members in which the sleeve is fitted; and a bush for housing at least an expansion portion of an elongate fastening element of said joint forming device such that said fastening element is engageable with said camming element housed in said sleeve, said bush having flexible membrane means extending from an end region thereof and said sleeve defining a recess for receiving said flexible membrane means whereby said bush is releaseably engageable with said sleeve.

6. A housing for a joint forming device for forming a joint between two members, the housing comprising:

a sleeve for housing a camming element of said joint forming device and having at least one moveable portion adapted to move outwardly of the outer periphery of the sleeve, in use, in response to movement of said camming element housed in the sleeve during tightening of said joint for forceably engaging a wall of a recess in the one of said joint members in which the sleeve is fitted; and a bush for housing at least an expansion portion of an elongate fastening element of said joint forming device such that said fastening element is engageable with said camming element housed in said sleeve, said bush being integral with said sleeve and connected to said sleeve by resilient means, said sleeve and bush comprising a first body part and a second body part, said body parts being snap-fittable together.

7. A device for use in forming a joint between two members, the device comprising a housing to be fitted in a recess in one of said members, a tightening element to be housed by said housing and an elongate fastening element having a longitudinal axis to be fitted to the other of said members, said tightening element having at least one camming surface cooperably engageable with a respective engaging surface of said fastening element whereby movement of said tightening element causes axial movement of said fastening element to cause said joint formed between said two members with said device to tighten, said housing comprising a sleeve for housing said tightening element, said housing having at least one moveable portion adapted to move outwardly of the outer periphery of the sleeve, in use, in response to tightening of said joint by said movement of the tightening element housed therein for forceably engaging with a wall of said recess in which the sleeve is fitted.

8. A device as claimed in claim 7, wherein said at least one moveable portion is resiliently deflectable in response to said movement of the tightening element.

9. A device as claimed in claim 7, wherein said at least one moveable portion is an integral part of said sleeve and is defined by one or more slots provided in said sleeve.

10. A device as claimed in claim 7, wherein said at least one moveable portion is defined by a respective generally L-shaped slot.

11. A device as claimed in claim 7, wherein said housing comprises one said moveable portion, said moveable portion comprising cam means cooperable with said tightening element housed in said sleeve for at least in part causing said outward movement of said moveable portion.

12. A device as claimed in claim 7, wherein said housing is provided with formations cooperably engageable with formations of the tightening element for facilitating locking of the joint forming device.

13. A device as claimed in claim 12, wherein said formations of the housing comprise circumferentially spaced depressions disposed in a surface of said sleeve which defines a recess for housing the tightening element and said formations of the tightening element comprise a plurality of protrusions on an external surface of the tightening element.

14. A device as claimed in claim 7, wherein said tightening element comprises cam means for actuating said at least one moveable portion.

15. A device as claimed in claim 7, wherein said housing further comprises a bush for housing at least an expansion portion of said elongate fastening element such that said at least one camming surface is engageable with the respective engaging surface of the fastening element by said movement of the tightening element, said bush being integral with, or releasably engageable with, said sleeve.

16. A device as claimed in claim 15, wherein said bush is connected, or connectable, with said sleeve by resilient means.

17. A device as claimed in claim 16, wherein said resilient means comprises a plurality of flexible membranes.

18. A device as claimed in claim 16, wherein said bush is releasably engageable with said sleeve, said bush having flexible membrane means extending from an end region thereof and said sleeve defining a recess for receiving said flexible membrane means.

19. A device as claimed in claim 15, wherein said bush is integral with said sleeve, said sleeve and bush comprising a first body part and a second body part, said body parts being snap-fittable together.

20. A device as claimed in claim 7, wherein said tightening element is rotatably housed by said sleeve and rotation of said tightening element about an axis of rotation thereof causes said axial movement of said fastening element and wherein axial movement of said fastening element towards said axis of rotation causes said joint to tighten.

21. A device as claimed in claim 7, wherein said housing comprises a plurality of said moveable portions, wherein at least one said moveable portion comprises cam means, said cam means being cooperable with said tightening element housed in said sleeve for at least in part causing outward movement of said moveable portion.

22. A joint forming device as claimed in claim 7, wherein said sleeve comprises a depth stop for limiting insertion of said sleeve into said recess in the one of said members in which the sleeve is fitted, said depth stop comprising a generally planar cap disposed at one end region of the sleeve.

* * * * *